(12) United States Patent
Silas et al.

(10) Patent No.: US 11,630,765 B2
(45) Date of Patent: Apr. 18, 2023

(54) FLASH TRANSLATION LAYER DESIGN USING REINFORCEMENT LEARNING

(71) Applicant: Google LLC, Mountain View, CA (US)

(72) Inventors: Shashwat Silas, Stanford, CA (US);
Narges Shahidi, San Jose, CA (US);
Tao Gong, Sunnyvale, CA (US);
Manuel Benitez, Cupertino, CA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 17/120,908

(22) Filed: Dec. 14, 2020

(65) Prior Publication Data
US 2022/0188011 A1 Jun. 16, 2022

(51) Int. Cl.
*G06F 12/02* (2006.01)
*G06N 3/08* (2023.01)
*G06F 3/06* (2006.01)

(52) U.S. Cl.
CPC .......... *G06F 12/0246* (2013.01); *G06N 3/08* (2013.01); *G06F 3/0604* (2013.01); *G06F 3/0655* (2013.01); *G06F 3/0679* (2013.01)

(58) Field of Classification Search
CPC .......... G06N 3/08; G06N 3/082; G06N 3/084; G06N 3/086; G06N 3/088; G06F 12/0246; G06F 3/0679
See application file for complete search history.

(56) References Cited

U.S. PATENT DOCUMENTS

| | | | |
|---|---|---|---|
| 10,811,075 B1* | 10/2020 | Cheng | G11C 29/42 |
| 2011/0213435 A1* | 9/2011 | Rom | G06N 20/00 607/17 |
| 2014/0359197 A1 | 12/2014 | Franceschini et al. | |
| 2017/0031816 A1* | 2/2017 | Lee | G06F 3/061 |
| 2019/0129636 A1 | 5/2019 | Benisty et al. | |
| 2020/0370423 A1* | 11/2020 | Li | G06N 3/08 |
| 2021/0072921 A1* | 3/2021 | Bielby | G06F 3/0616 |

(Continued)

FOREIGN PATENT DOCUMENTS

CN 110134697 A 8/2019

OTHER PUBLICATIONS

Greedy Algorithm by Whatls (Year: 2015).*

(Continued)

*Primary Examiner* — Paul M Knight
(74) *Attorney, Agent, or Firm* — Lerner David LLP

(57) ABSTRACT

The subject matter described herein provides systems and techniques to counter a high write amplification in physical memory, to ensure the longevity of the physical memory, and to ensure that the physical memory wears in a more uniform manner. In this regard, aspects of this disclosure include the design of a Flash Translation Layer (FTL), which may manage logical to physical mapping of data within the physical memory. In particular, the FTL may be designed with a mapping algorithm, which uses reinforcement learning (RL) to optimize data mapping within the physical memory. The RL technique may use a Bellman equation with q-learning that may rely on a table being updated with entries that take into account at least one of a state, an action, a reward, or a policy. The RL technique may also make use of a deep neural network to predict particular values of the table.

22 Claims, 6 Drawing Sheets

(56) References Cited

U.S. PATENT DOCUMENTS

2021/0248069 A1* 8/2021 Jang ................. G06F 3/064

OTHER PUBLICATIONS

On the Theory of Spatial and Temporal Locality by Snir (Year: 2005).*
Optimal control theory and the linear Bellman Equation by Kappen (Year: 2011).*
Reinforcement Learning Neural Network to the Problem of Autonomous Mobile Robot Obstacle Avoidance by Huang (Year: 2005).*
Reinforcement Learning: A Tutorial by Harnon (Year: 1997).*
By Emmanuel Goossaert Coding for SSDs—Part3: Pages, Blocks, and the Flash Translation Layer by Goossaert (Year: 2014).*
Sbeed: Convergent Reinforcement Learning with Nonlinear Function Approximation by Dal (Year: 2018).*
Amplification to Maximize Storage-System Lifetime (Year: 2020).*
Designing Neural Network Architectures Using Reinforcement Learning by Baker (Year: 2017).*
Capes: Unsupervised Storage Performance Tuning Using Neural Network-Based Deep Reinforcement Learning by Li (Year: 2017).*
Q-Value Prediction for Reinforcement Learning Assisted Garbage Collection to Reduce Long Tail Latency in SSD by Kang (Year: 2020).*
Neuron-Level Fuzzy Memoization in RNNs by Silfa (Year: 2019).*
Sampling with Memoization by Pfeffer (Year: 2007).*
Extended European Search Report for European Patent Application No. 21171631.1 dated Oct. 22, 2021. 9 pages.
Chiang, M. L. et al. Using Data Clustering to Improve Cleaning Performance for Flash Memory. Software-Practice and Experience. vol. 29(3). Mar. 5, 1999. pp. 267-290.
Kang, W. et al. Q-Value Prediction for Reinforcement Learning Assisted Garbage Collection to Reduce Long Tail Latency in SSD. IEEE Transactions on Computer-Aided Design of Integrated Circuits and Systems, vol. 39, No. 10, pp. 2240-2253, Oct. 2020, doi: 10.1109/TCAD.2019.2962781.
Luo, Y. et al. Warm: Improving NAND Flash Memory Lifetime with Write-hotness Aware Retention Management. 2015 31st Symposium on Mass Storage Systems and Technologies (MSST), Santa Clara, CA, 2015, pp. 1-14, doi: 10.1109/MSST.2015.7208284.
Park, D. et al. Hot Data Identification for Flash-based Storage Systems Using Multiple Bloom Filters. 2011 IEEE 27th Symposium on Mass Storage Systems and Technologies (MSST), Denver, CO, 2011, pp. 1-11, doi: 10.1109/MSST.2011.5937216.
Shafaei, M. et al. Write Amplification Reduction in Flash-Based SSDs Through Extent-Based Temperature Identification. HotStorage'16: Proceedings of the 8th USENIX Conference on Hot Topics in Storage and File Systems. Jun. 2016. pp. 106-110.
Stoica, R. et al. Improving Flash Write Performance by Using Update Frequency. Proceedings of the VLDB Endowment. vol. 6 (1). Jul. 2013. pp. 733-744.

* cited by examiner

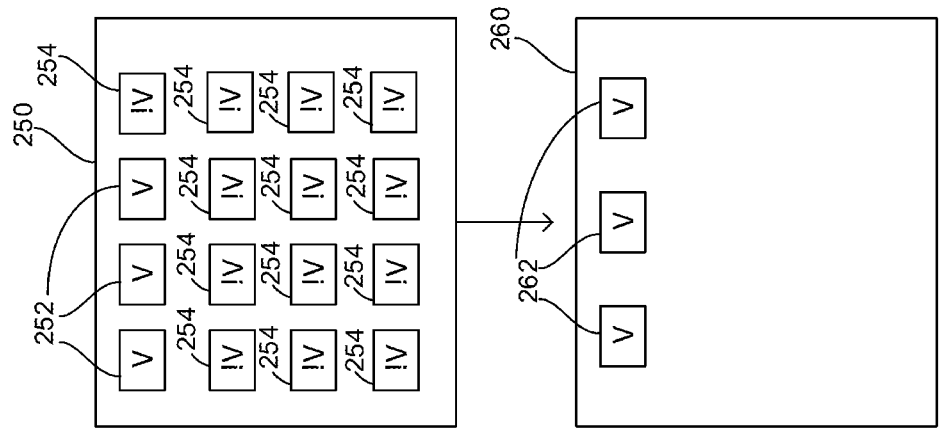
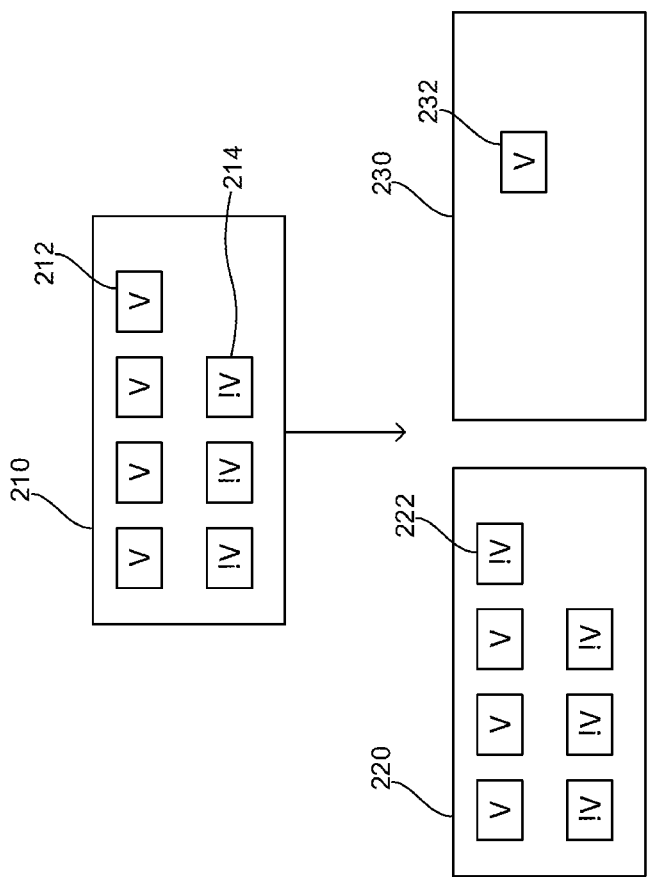
FIG. 2B
FIG. 2A

FLASH TRANSLATION LAYER DESIGN USING REINFORCEMENT LEARNING

BACKGROUND

Physical memory such as flash memory typically stores data in cells which may each store one or a small number of bits. Each cell of the physical memory may only undergo a fixed number of cycles where data is written and erased, known as program/erase cycles, before becoming unreliable. Within the memory, cells are grouped together into sectors, which are grouped together into blocks. Blocks may also be known as erase units. While data may be read or written/programmed at the granularity of a sector, data may only be erased at the level of a block/erase unit. In addition, physical memory such as flash memory may have an erase-before-write characteristic for which a sector of flash memory is prepared by being erased, before it is written. This necessitates additional complexity in updating a small portion of previously written information. For example, to update a single sector of data, the updated data has to be written to a new sector and the previous sector invalidated. Invalidated data may be erased in the future by a technique known as garbage collection. When the physical memory becomes nearly full, a garbage collection (GC) algorithm may target for erasure block(s) that have many invalidated sectors, copy only the valid sectors of the block(s) to be erased to an empty block, and erase the original targeted block. This may free up space in the physical memory for future data, but incurs additional physical memory writes which are not the result of user requests. In addition, additional writes may be incurred to ensure that the cells, and therefore sectors, of the physical memory wear down in a uniform manner Therefore, there is a need for systems and techniques to minimize a number of physical memory writes, while also ensuring uniform wear and longevity of the physical memory.

BRIEF SUMMARY

The additional cost of data writes, which may not be by a user's request, to a physical memory, may be quantified by a factor known as write amplification (WA). A high write amplification may have adverse consequences on the lifetime and performance of the physical memory due to the wear on cells and sectors associated with many writes. Aspects of what is disclosed herein counter a high write amplification, ensure the longevity of the physical memory, and ensure that the physical memory wears in a more uniform manner.

In general, one aspect of the subject matter described in this specification is a process for writing data to physical memory. The physical memory may be a flash memory. A current state may be determined based on the physical memory. If the current state is in a table comprising a plurality of entries, one or more events may occur. In particular, an agent may be executed, using one or more processors, to choose a current action from a plurality of actions. Each of the plurality of actions may be associated with a location within the physical memory to write data. The agent may choose the current action based on one of a greedy policy, a $\varepsilon$-greedy policy, or a decaying $\varepsilon$-greedy policy. The agent may include a memory mapping algorithm. The data may be written to the physical memory based on the current action. A reward may be observed based at least in part on the current state and the current action. At least one entry of the plurality of entries of the table may be updated, using the one or more processors, based on the observed reward, to produce an updated table. The reward may be a value that is inversely related to a write amplification factor associated with the physical memory. The at least one entry of the plurality of the entries of the table may be updated using a Bellman equation. A neural network may be trained using the updated table. The neural network may be a deep neural network. The neural network may be used to predict future entries of the table. Each entry of the plurality of entries of the table may be a q-score/q-value calculated using reinforcement learning. Each entry of the plurality of entries of the table may be associated with a write-amplification factor based on the location within the physical memory to write data. A least recently used entry of the plurality of entries in the table may be removed.

Another aspect of the subject matter includes a system for writing data to physical memory. The system may include one or more processors that are configured to perform one or more operations. The physical memory may be a flash memory. A current state may be determined based on the physical memory. If the current state is in a table comprising a plurality of entries, one or more events may occur. In particular, an agent may be executed to choose a current action from a plurality of actions. Each of the plurality of actions may be associated with a location within the physical memory to write data. The agent may choose the current action based on one of a greedy policy, an $\varepsilon$-greedy policy, or a decaying $\varepsilon$-greedy policy. The agent may include a memory mapping algorithm. The data may be written to the physical memory based on the current action. A reward may be observed based at least in part on the current state and the current action. The reward may be a value that is inversely related to a write amplification factor associated with the physical memory. At least one entry of the plurality of entries of the table may be updated, based on the observed reward, to produce an updated table. The at least one entry of the plurality of the entries of the table may be updated using a Bellman equation. A neural network may be trained using the updated table. The neural network may be a deep neural network. The neural network may be used to predict future entries of the table. Each entry of the plurality of entries of the table may be a q-score/q-value calculated using reinforcement learning. Each entry of the plurality of entries of the table may be associated with a write-amplification factor based on the location within the physical memory to write data. A least recently used entry of the plurality of entries in the table may be removed.

Yet another aspect of the subject matter includes a non-transitory computer-readable medium storing instructions, that when executed by one or more processors, cause the one or more processors to perform various operations. A current state may be determined based on a physical memory. The physical memory may be a flash memory. If the current state is in a table comprising a plurality of entries, one or more events may occur. In particular, an agent may be executed to choose a current action from a plurality of actions. Each of the plurality of actions may be associated with a location within the physical memory to write data. The agent may choose the current action based on one of a greedy policy, an E-greedy policy, or a decaying $\varepsilon$-greedy policy. The agent may include a memory mapping algorithm. Data may be written to the physical memory based on the current action. A reward may be observed based at least in part on the current state and the current action. The reward may be a value that is inversely related to a write amplification factor associated with the physical memory. At least one entry of the plurality of entries of the table may be updated, based on the observed reward, to produce an updated table. The at least one entry of the plurality of the entries of the table may be updated using a Bellman equation. A neural network may be trained using the updated table. The neural network may be a deep neural network. The neural network may be used to predict future entries of the table. Each entry of the plurality of entries of the table may be a q-score/q-value calculated using reinforcement learning. Each entry of the plurality of entries of the table may be associated with a write-amplification factor based on the location within the physical memory to write data. A least recently used entry of the plurality of entries in the table may be removed.

BRIEF DESCRIPTION OF THE DRAWINGS

FIGS. 2A and 2B are diagrams that illustrate blocks of a physical memory, and how data is written and erased from the physical memory in accordance with aspects of the disclosure.

DETAILED DESCRIPTION

The additional cost of writing data, which may not be by a user's request, to a physical memory, may be quantified by a factor known as write amplification (WA), which is expressed as:

$$WA = \frac{\text{total amount of data written in physical memory}}{\text{total amount of data written by the user}}$$

This write amplification (WA) factor is at least and ideally equal to 1 as data is stored and erased from the physical memory. However, additional writes, which are not based on user requests, may cause the write amplification (WA) factor to be high. High write amplification may have adverse consequences on the lifetime and performance of the physical memory. This may be because of the aforementioned wear on the cells and sectors of the physical memory due to increased program/erase cycles associated with the additional writes.

To counter a high write amplification, write/program and erase decisions can be managed within the physical memory. In particular, to manage write amplification, data may not be written into physical memory based on a logical block address provided by a user. Instead, a logical block address may be mapped to physical block address. Additionally, a load balancing strategy, which may ensure that the physical memory is used evenly, may ensure physical memory wears in a uniform manner. In addition, any additional writes beyond those requested by a user, such as during garbage collection, may be minimized, which can be accomplished by minimizing the write amplification.

A Flash Translation Layer (FTL), which may manage logical to physical mapping of data within the physical memory, is proposed. The FTL may be responsible for translating logical block addresses provided by a user to physical block addresses in the physical memory. The FTL may further be responsible for moving data around in the physical memory in order to ensure that program/erase (P/E) cycles of each physical memory block may be uniform. The FTL may also be responsible for reclaiming physical memory blocks which contain invalidated data by copying their valid data to new blocks and erasing them garbage collection (GC). The FTL may include (i) a garbage collection (GC) algorithm, (ii) a wear-leveling (WL) algorithm, which ensures that physical memory wears in a uniform manner via writing or copying data to appropriate places in the physical memory (iii) and a mapping algorithm. Such an FTL may ensure that the physical memory wears in a uniform manner and that write amplification is minimized.

Systems and processes are described in which, for given garbage collection and wear-leveling algorithms, the FTL uses reinforcement learning to derive an optimal mapping algorithm. Such systems and processes associated with the mapping algorithm may be used to reduce write-amplification over a period of time, while also ensuring uniform wear and longevity of the physical memory.

Figure 1:
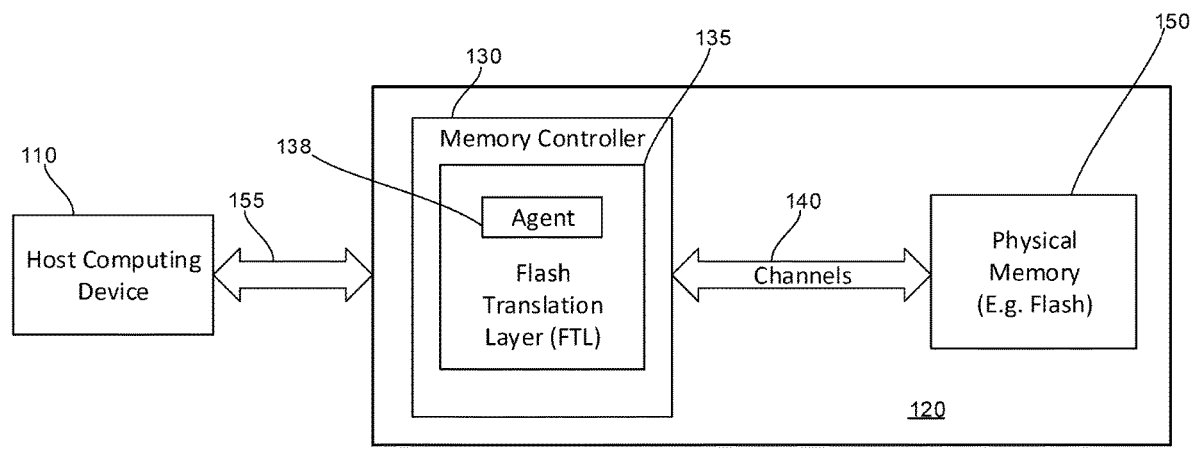
FIG. 1 is block diagram illustrating a computing system in accordance with aspects of the disclosure.

FIG. 1 is a block diagram illustrating a computing system 100. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests, such as requests from a user to the data storage device. The host 110 may take a number of forms. As some examples, the host 110 may be implemented as a personal computer, a laptop computer, a server, a tablet computer or a netbook computer. In other implementations, the host 110 may take other forms as well.

The data storage device 120 also may take a number of forms. The data storage device 120 may be implemented as a number of appropriate devices that may work in conjunction with a host device, such as the host device 110, to store, retrieve, and or erase electronic data. For instance, the data storage device may be a solid state drive (SSD), such as a flash memory based SSD, a magnetic disk drive, or an optical disk drive, as some examples. In some examples, data storage device 120 may be located within host device 110.

As shown in FIG. 1, the data storage device 120 includes a memory controller 130, memory device channels 140, which may also be referred to as channels used to relay requests, and physical memory 150. The physical memory 150 may be implemented using a number of different types of memory devices. For instance, the physical memory 150 may be implemented using flash memory devices, such as NAND flash memory devices, or other types of non-volatile memory devices. In certain implementations, volatile memory devices, such as random access memory devices, may be used for the physical memory 150. For purposes of this disclosure, the various implementations described herein will be principally discussed as being implemented using flash memory devices. It will be appreciated, however, that other approaches are possible and other types of memory devices may be used to implement what is described herein.

In the computing system 100, as well as in other implementations described herein, the memory controller 130 may obtain memory operation commands or requests from the host computing device 110, which may receive such requests from a user. The memory operation commands obtained by the data storage device 120 and the memory controller 130, from the host computing device 110, may include memory read requests, memory write/program requests, and memory erase requests, as well as other types of memory requests, such as for example move commands and/or copy commands.

For purposes of this disclosure, the terms memory operation request, memory operation, and memory command may be used interchangeably to describe machine-readable instructions, such as from a host computing device to a data storage device, to execute one or more data storage functions in a data storage device.

In computing system 100, the memory controller 130 may include a Flash Translation Layer (FTL) 135. Although the memory controller 130, the FTL 135, and the agent 138 are depicted being within data storage device 120, one or more of these could be located in host computing device 110 without departing from the scope and spirit of the what is described herein. For example, the FTL 135 and the agent 138 may be located within host computing device 110. As another example, the memory controller 130 may include the FTL 135 and the agent 138, and may be located within host computing device 110. The FTL 135 may manage logical to physical mapping of data within the physical memory 150. FTL 135 may be responsible for (i) translating logical block addresses provided by the host computing device 110 to physical block addresses in the physical memory 150, (ii) moving data around in the physical memory 150 in order to make sure that program/erase (P/E) cycles of each physical memory block may be uniform, and (iii) reclaiming physical memory blocks which contain invalidated data by copying their valid data to new blocks and erasing them, such as by performing garbage collection (GC).

FTL design may optimize the lifetime and performance of a physical memory 150, such as a flash memory based solid state drive, SSD. FTL 135 may be a collection of software modules, operating as a part of or in conjunction with the memory controller 130. These FTL 135 may include (i) a garbage collection (GC) algorithm, (ii) a wear-leveling (WL) algorithm (iii) and a mapping algorithm. One or more of these components may be included as a part of an agent 138, which may be similar to the agents discussed at greater length below in connection with FIGS. 3, 4, and 5. The agent 138 may make decisions regarding actions such as one or more locations or write-points where data is to be written within physical memory 150 by the memory controller 130. The overall uses of the FTL 135 may be complex. For example, the FTL 135 may be used to: (i) maintain load balancing with regards to the P/E cycles at level of each block/erase-unit, and (ii) minimize write amplification. These uses may be interrelated. For example, infrequently accessed data blocks, which have undergone relatively few P/E cycles, can be copied and erased by the wear-leveling algorithm in order to maintain balance with other data blocks. This, however, may increase the overall write amplification.

In the computing system 100, the physical memory 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes multiple flash physical memory 150 devices that are implemented in multiple separate device packages, such as, for example, four flash memory devices per package. In such an approach, the memory controller 130 may communicate with the physical memory 150 of each memory channel using a separate memory device channels 140. Each set of memory device channels 140 may include a respective channel controller that is configured to facilitate communication between the physical memory 150 of the respective memory channel and the memory controller 130. For example, such channel controllers may be configured to manage a shared bus between the memory controller 130 and the physical memory 150 of a given memory channel, including communicating memory operation commands, chip select information, as well as managing communication of other data and control information between the memory controller 130 and the physical memory 150 over corresponding memory device channels 140.

In one example implementation, the memory controller 130 and other components may be disposed on a printed circuit board and the physical memory 150 may be disposed on one or more other printed circuit boards. The printed circuit boards may be assembled together.

In one example implementation, a high speed link 155 may be used to connect the host computing device 110 and the data storage device 120. The link 155 may be a physical connector or it may be a logical connector. For instance, the link 155 may be a PCI-e link to connect and route signals between the host computing device 110 and the data storage device 120.

FIGS. 2A and 2B are diagrams that illustrate blocks of physical memory 210, 220, 230, 250, and 260, and how data is written and erased from physical memory. In FIG. 2A, physical memory block 210 may have several sectors. The physical memory block 210 may include one or more valid sectors, such as valid sector 212. Each valid sector 212 may contain data that is valid and not to be erased. The block 210 may also include one or more invalid sectors, such as invalid sector 222. Each invalid sector 222, may include data that may be erased. The invalid sector data may be erased, for example, during garbage collection (GC). When sector 212 no longer contains valid information and needs to be erased, it may be invalidated. For example, the physical memory block 220, which is similar to block 210, includes invalid sector 222 that has been invalidated. When new data needs to be written to a sector or data from an existing sector needs to be copied, the data may be placed in a sector of an existing physical memory block or it may be placed in a new block. For example, the physical memory block 210 may include valid sector 212, which may have been recently written with data. As another example, the physical memory block 230 may include valid sector 232, which may have been recently copied from another block.

In FIG. 2B, physical memory block 250 may have several sectors. The physical memory block 250 may include one or more valid sectors 252, and one or more invalid sectors 254. A garbage collection (GC) algorithm, as described herein, may target for erasure block(s), such as block 250, which have many invalid sectors, such as sectors 254. The GC algorithm may copy only the valid sectors, such as sectors 252, of the block to be erased to an empty block, such as physical memory block 260. The GC algorithm may erase the original targeted block, such as block 250. As a result, physical memory block 260 may contain valid sectors 262 copied from block 250, prior to that block's erasure.

The FTL may use a mapping algorithm to make decisions as to in which block/sector data should be written in physical memory when it receives a logical block address (LBA) and data to write from a user. The mapping algorithm may investigate the state of the physical memory at both the sector and block level, and the logical to physical mapping tables. The mapping algorithm may 'decide' where to place the data in physical memory. This decision may incur several costs with regards to the write-amplification factor, such as those described above: (i) the cost of writing the data (ii) the cost incurred by the GC algorithm if it decided to move data as a consequence of the mapping decision (iii) the cost incurred by the WL algorithm if it decided to move data based on the mapping decision. According to some examples, such costs may be equally weighted. Such costs may be added and represented as a total cost (TC) for each write requested by user using the following formula:

TC(write request $i$)=|write $i$|+GCcost+WLcost where |write it| is the cost associated with the data of the ith user data write request, GCcost is the cost of the garbage collection algorithm, such as for it to possibly move data, and WLcost is the cost of the write-leveling algorithm, such as for it to possibly move data. The TC is directly related to and associated with the write amplification factor. In an ideal scenario, if GCcost and WLcost were zero, then the write amplification (WA) factor would be equal to one.

In practice, the mapping algorithm may not decide exactly which sector to write to, and the physical memory may support multiple user write-points. A write-point may be a designated collection of blocks to which each sector within is written sequentially. Given a single write-request with a LBA, a mapping algorithm may decide where in physical memory to write the information by choosing one of the N available write-points with the objective of minimizing long-term WA.

There may be two high-level approaches to use machine learning to create a mapping algorithm that has a low WA. These may be referred to as an upstream approach and a downstream approach. The two paradigms/approaches may be thought of as the distinction between a classical clustering setting and a modern reinforcement learning (RL) setting. The first of these two paradigms may be known as the upstream approach, and the second of the two paradigms may be known as the downstream approach.

In the upstream approach, the mapping can be thought of as an N-class classification task, where the designer of the mapping algorithm might try to guess a good way to arrange the data in physical memory. The designer may program a mapping algorithm which approximates this arrangement. The name upstream may symbolize that the features and objective function for machine learning may be characteristics of the data itself. The WA cost of a mapping algorithm designed using the upstream approach may be a consequence of both how well the classifier performs on data, and how well the designer guessed the relationship between optimal performance of their classifier and WA cost. The success of the designer's guess may depend on their understanding of the GC and WL algorithms. For example, one design for an upstream mapping algorithm may involve bucketing data by hotness. Such bucketing may be tantamount to classifying data based on frequency of access with a heuristic. The heuristic may involve the understanding that assigning similarly hot data to the same write-point might, in the future, minimize the total WA. Such upstream approaches may improve the performance of an SSD with regards to lifetime and WA.

Generally, the upstream approach may involve the designer of the mapping algorithm to guess a good heuristic, such as hotness, by which to cluster data. This may not be optimal because an optimal mapping may require more than the use of a simple rule. In particular, a good heuristic may depend on a deep understanding of the WL algorithm and the GC algorithm, and therefore may be brittle in the face of changes to these algorithms. In addition, the data may be inherently difficult to classify according to a heuristic. As an example, a text document which stores a user's to-do list may be changed very frequently whereas the user's curriculum vitae might be accessed rarely. This may be true despite both including text data created by the same application. Additionally, internal operations taking place on the physical memory, like garbage collection, might break the physical cluster patterns which may have been intended by the designer of the mapping algorithm.

The downstream approach may offer a more principled approach for mapping algorithm design. In this approach, the designer of the mapping algorithm may specify the GL and WL algorithms. The mapping algorithm may receive a write request with a logical block address (LBA) for which it may choose one of N write-points based on a logical to physical mapping table. However, under this approach, the designer may not provide the mapping algorithm with any heuristic(s). The best way to map the logical block address to physical addresses or write-points in the physical memory may be learned by observing the downstream effect of the mapping algorithm's decisions on the WA directly.

Figure 3:
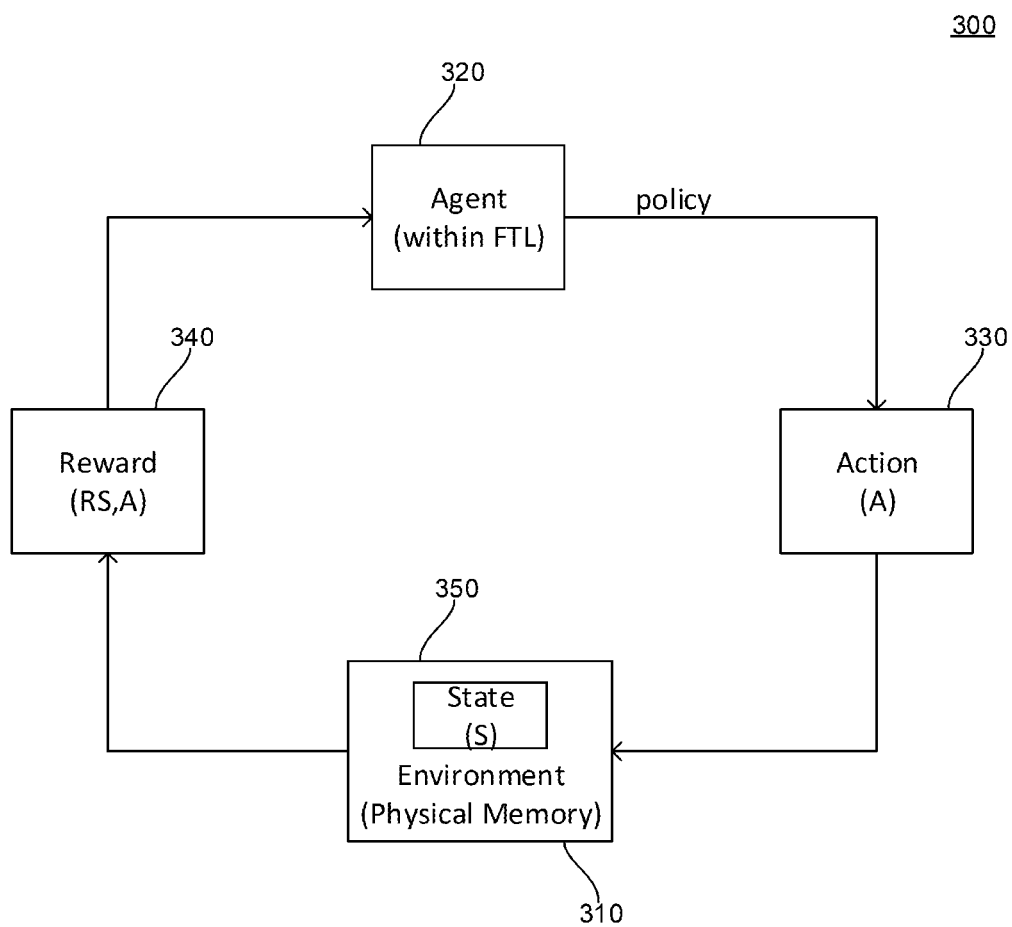
FIG. 3 illustrates a mapping algorithm designed as a reinforcement learning (RL) problem in accordance with aspects of the disclosure.

FIG. 3 is a high-level diagram that illustrates model 300 of how a mapping algorithm may be designed as a reinforcement learning (RL) problem. Model 300 includes environment 310, agent 320, action (A) 330, reward ($r_{S,A}$) 340, and state (S) 350. The state (S) 350 may be assessed based on the environment 310. The environment 310 may be a model of the physical memory, including which sectors within physical memory blocks include valid data, and which sectors within physical memory blocks include invalid data. The agent 320 may be the mapping algorithm that may make decisions as to in which block/sector data should be written in physical memory when it receives a LBA and data to write from a user. The action (A) 330 may be one choice of a write-point to write data within physical memory made by the agent 320 out of several possible actions. The possible actions may include all possible write-points in the physical memory. The write-points may be enumerated as 1:N, which may correspond to actions 1:N, if the agent is choosing to write data. The write-point may be indicated to be ⊥, which may correspond to the null action, if request to the agent is not a write, such as a request to invalidate a sector or the read of physical memory.

The state (S) 350 may be one of several states, which may each be a collection of features that approximate the condition of the environment 310 and take into account features from the user and from the physical memory, among other information. As one example, the features which may represent the state may include a short history of previous requests and their sizes (RH), some upstream information (TH) about the data being written by the user (user request) from the upper layers (e.g., the application layer), a short history of previous actions chosen by the agent (AH), and of free physical memory blocks per write-point and the number of valid sectors (bucketed) per block for each write-point (BAM). Each of these features may have particular utility for the design of the mapping algorithm. For example, the RH may be used to understand user behavior, the TH may be used to understand data clusters, the AH may be used to understand FTL behavior, and the BAM may be used to understand the state of the physical memory and for predicting which write-points will have lower write amplification due to either having abundant space or containing good candidate memory blocks for efficient garbage collection. The state (S) 350 may be represented using the following formula:

State $S=(RH, AH, TH, BAM, \text{request } i)$

In some examples, rather than using the upstream information directly, a separate clustering algorithm may be used to predict data clusters. The output of this clustering algorithm may be used as a feature in the state 350. This may improve versatility and may also significantly lower the number of states needed. In some examples, instead of using the BAM directly, another simple algorithm may be used that takes the BAM as input and outputs a predicted GC algorithm efficiency for each write point. The output of this simple prediction algorithm may be based on the availability of empty space in the physical memory and good GC candidate memory blocks. The output may be used as a feature in the state 350, which may significantly lower the number of states needed.

The states and actions may be represented by a state transition diagram (such as a Markov chain) in which each action results in a transition to a different state. When the agent 320 chooses an action (A) 330, such as a current action, which may be 1:N or ±, the state may transition from the current state, S, to the next state, S', where S' is represented using the following formula:

State $S=(RH', AH', TH', BAM', \text{request } i)$

The BAM may be updated when data is written to the physical memory or by the operation of the GC and/or WL algorithms in the time gap between request i and i+1. When the next request (i+1) arrives at time i+1, the histories with the oldest entries may be removed.

The reward ($r_{S,A}$) 340 may be an incentive provided to the agent 320 for it to learn how to maximize long-term 1/WA. The reward 340 may be generated by observing the value of the WA in physical memory for every action chosen by the agent. The reward 340 may be communicated back to the agent in order to aid learning for the agent. The reward 340 may be the instantaneous reward for executing the $i^{th}$ write request by the agent. If the request is not a write, the instantaneous reward may be 0. For the $i^{th}$ write request, the reward ($r_{S,A}(i)$) may be computed using the following formula:

$$rS, A(i) = \frac{|\text{write data}|}{TC(\text{write request } i)}$$

In some examples, the write request may not be further compressed, so that:

$$\frac{|\text{write data}|}{TC(\text{write request } i)} < 1 \text{ for all } i$$

In some examples, the overall reward may not be the sum of instantaneous rewards over time, but maximizing this reward may result in good performance in terms of the overall write amplification. In some examples, the reward may be a function of the write amplification factor. In some examples, the reward may be inversely related to the write amplification and the write amplification factor.

In some examples, each (state, action) pair is assigned a q-score, based on the expected long-term reward of performing the action in the state. For example for each state (S) 350 and action (A) 330, a q-score may be assigned. The agent may select a current action from all possible actions using a pre-determined policy based on this q-score. For example, the agent may select a current action using a greedy policy, an ε-greedy, a decaying an ε-greedy, among other policies. In some examples, the agent may then proceed performing the action which generated the maximum q-score given the state with a probability of 1−ε, or a random action with probability ε. This may be known as an ε-greedy policy, which is employed by the agent. For example the action (A) 330 may be chosen by agent 320 based on an ε-greedy policy to maximize the q-score with probability 1−ε, or a random action, resulting in a less than maximum q-score, with probability ε. Such an approach may balance exploitation by the agent, such as choosing the maximum expected long-term reward, and exploration by the agent, such as e.g., discovering new states that have a different expected reward.

The agent 320 may be trained using model 300. In particular, given a current state (S) 350, which is associated with a write request, the agent may predict a q-value for each action (A) 330 of 1:N actions. The agent may then choose a current action (A) 330 based on the ε-greedy policy described above. After performing the action, the agent may observe the reward ($r_{S,A}$) 340 based on the current state and the current action. The agent 320 may train itself so that it may be more likely to predict a reward closer to the observed reward for the current action if it arrives at the same state again. The agent 320 may use the following equation, which a time-difference learning Bellman-update equation, for training itself:

$$Q(S,A)=Q(S,A)+\alpha[rS,A+\gamma\max A'Q(S',A')-Q(S,A)].$$

In this equation, a may be the learning rate and y may be the discount factor for future rewards. This equation may represent the q-score or a q-value that may be stored in a table, also referred to herein as a q-table. A q-score/q-value may be generated and stored for each state and action pair within the table. However, because of the large number of state and action pairs, and as a result the large number of q-scores/q-values entries that may need to be stored in memory, a cached table approach may be advantageous. Such an approach is discussed further in connection with FIG. 5.

Figure 4:
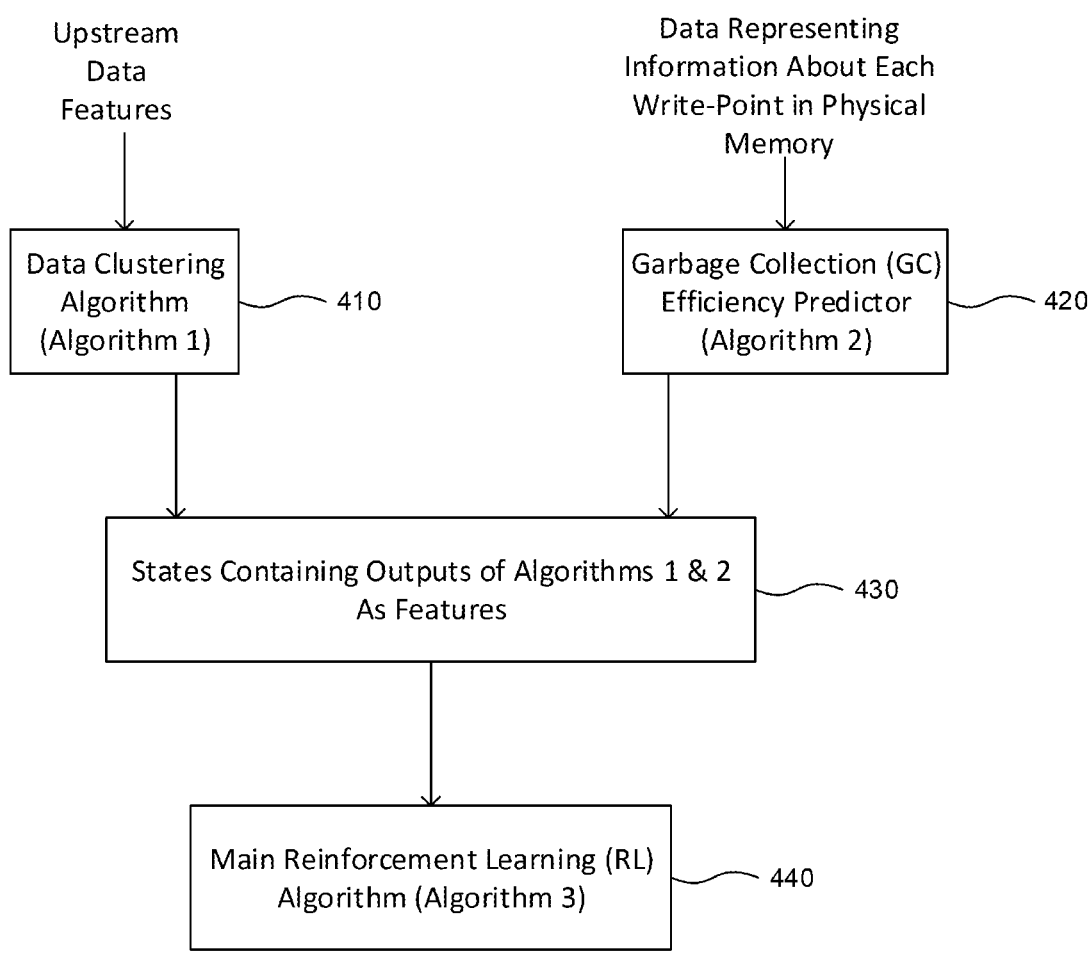
FIG. 4 is illustrates how the dimension of the state space in a reinforcement learning model may be reduced in accordance with aspects of the disclosure.

FIG. 4 illustrates model 400 of how the dimension of the state space in the reinforcement learning model 300 may be reduced. To define the state space in the reinforcement learning algorithm, and a model such as model 300, as discussed in connection with FIG. 3, an ensemble approach of using several algorithms to reduce the state space may be useful. In particular, it may be advantageous to use the lower dimensional outputs of several algorithms, which process raw high dimensional features, in order to define features in the state space. This approach may greatly reduce the number of states while also incorporating a large variety of descriptive features into each state.

For example, model 400 may include data clustering algorithm (algorithm 1) 410 and a garbage collection (GC) efficiency predictor (algorithm 2) 420, states 430 that contain the output of algorithms 410 and 420 as features. Model 400 may also include a main reinforcement learning (RL) algorithm 440 (algorithm 3), which may be the same as the mapping algorithm optimized by using RL techniques as described in connection with FIGS. 1-3. Although only the outputs of two algorithms are depicted as being input as features in states 430, additional or fewer algorithms may be used (ensemble approach). Such a model and approach may allow the RL algorithm 440 to combine the known advantages of data clustering and choosing write-points based on GC efficiency.

In model 400, upstream information about the write request, which can, for example, be used to classify the hotness or coldness of the write request data, may be input to data clustering algorithm 410. The data clustering algorithm 410 may be used to predict data clusters. The output of the data clustering algorithm 410 may be used as a features in the states 430. This may improve versatility and may also significantly lower the number of states 430 needed by the RL algorithm/mapping algorithm. Downstream information such as the number of free blocks for each write-point and the number of valid sectors (bucketed) per block for each write-point may be input to GC efficiency predictor 420. The output of the GC efficiency predictor 420 may be based on the availability of empty space in the physical memory and good GC candidate memory blocks. The output of the GC efficiency predictor 420 may be used as features in the state 430. This may significantly lower the number of states 430 needed by the RL algorithm/mapping algorithm.

It may be desirable to have as small a number of states 430 for the RL algorithm 440 as possible without losing meaningful information. This may make the RL algorithm 440 efficient to train. The states 430 may be used as input to the main RL algorithm 440, which may use these as the states in its model, such as described what is described in connection with FIG. 3 and model 300. Such an ensemble approach may have the added advantage of providing flexibility in the choice of the algorithms used, such as a choice of the type of algorithm 1 and algorithm 2 that is used. For example, multiple previously researched data clustering algorithms that improve the performance of the physical memory may be used. As another example, a separate algorithm which classifies the predicted GC efficiency of each write-point based on the number of blocks containing mostly invalidated data may be used.

Figure 5:
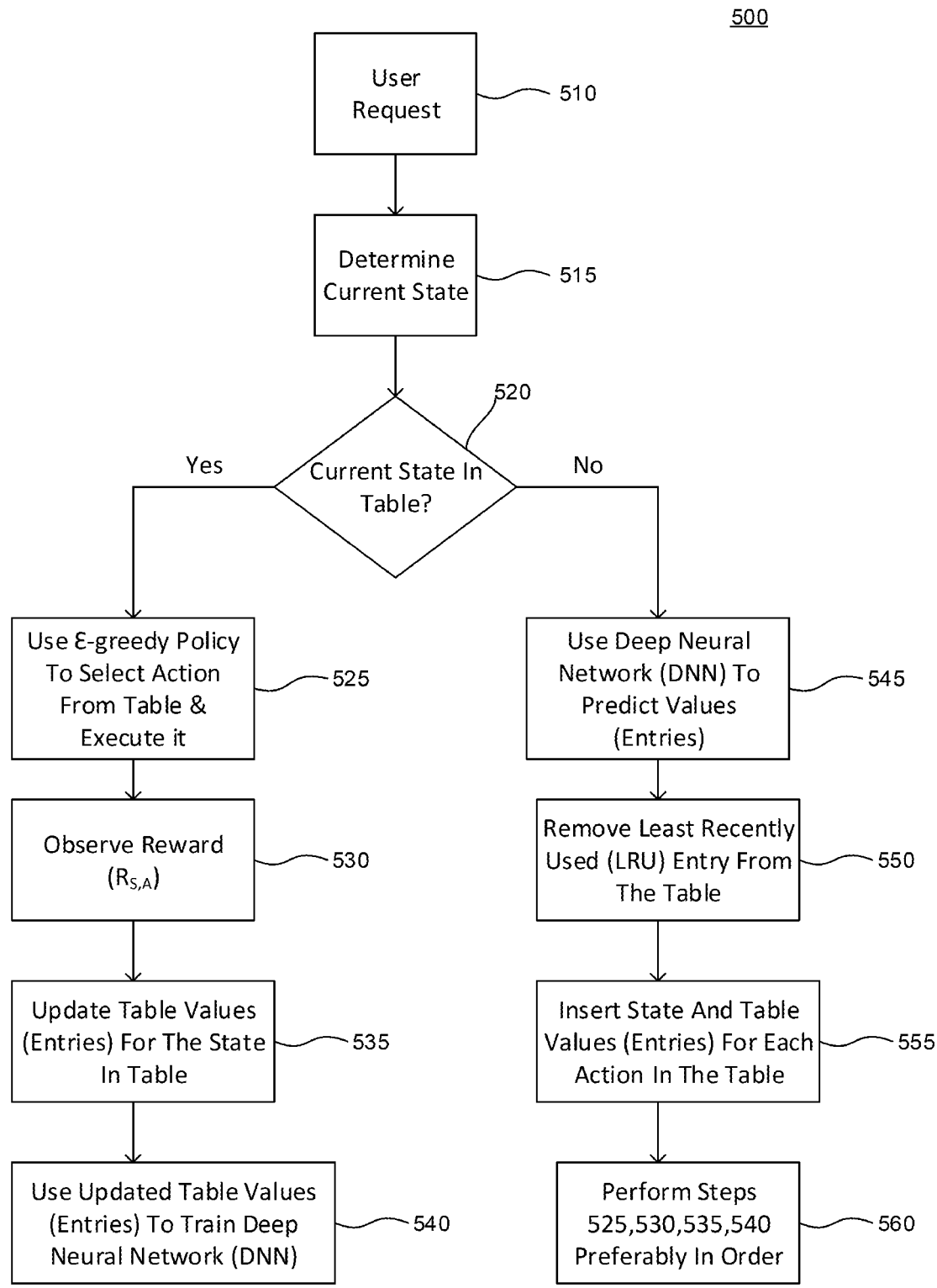
FIG. 5 is a flow diagram of an example process for updating a q-score/q-value table in accordance with aspects of the disclosure.

FIG. 5 is a flow diagram of example process 500 for updating a q-score/q-value table. The process 500 may be performed, by way of example, using a memory controller and/or a memory device and may use other resources of one or more computing devices, such as what is described in connection with FIGS. 1 and 6. In particular, an agent such as agent 320, described in connection with FIG. 3, may perform all or a portion of the blocks of process 500. Each of the operations of process 500 may be shown as a block of FIG. 5.

In block 510, a user request for a write to a physical memory, such as the $i^{th}$ write described in connection with FIG. 3, may be received. The user request may be received via a host computing device, such as by host computing device 110 of FIG. 1. The user request may result in a write request along with a LBA for the memory controller, such as memory controller 130 of FIG. 1 in conjunction with a flash translation layer, such as FTL 135, to write data to a physical memory, such as physical memory 150 of FIG. 1.

In block 515, a current state may be determined. The state, such as state (S) 350 described in connection with FIG. 3, may be one of several states. Each state may be a collection of features that approximate the condition of the physical memory environment, such as environment 310 of FIG. 3. The current state may also take into account other features from the user, the host computing device, the FTL, and the physical memory, among other information.

In block 520, it may be determined whether the current state from block 515 is in the entries of the q-score/q-value table. Such a table may also be referred to as a q-table, a q-score table, and/or a q-value table. If it is determined at block 520 that the current state is within the q-score/q-value table, the process 500 may proceed to block 525. If it is determined at block 520 that the current state is not within the q-score/q-value table, the process 500 may proceed to block 545.

In block 525, the agent may choose a current action using a pre-determined policy based on a q-score for that action. For example, the agent may select a current action using a greedy policy, an ε-greedy policy, a decaying ε-greedy policy, among other possible policies. The chosen action may be one choice of a write-point to write data within physical memory made by the agent out of several possible actions associated with other write-points. The possible actions may include all possible write-points in the physical memory. The write-points may be enumerated as 1:N, based on the location in physical memory in which the agent may choose to write data. The chosen current action may result in writing data to the physical memory at the write-point associated with the chosen action. Each possible action may result in a possible q-score/q-value, which may be determined based on a state, action (S, A) pair entry in the table of q-scores/q-values. In some examples, the agent may then proceed performing an action that generates the maximum q-score with a probability of 1-ϵ, or a random action with probability ε. This may be known as an ε-greedy policy which is employed by the agent such as what is described in connection with FIG. 3.

In block 530, the agent may observe the reward associated with the current state and the chosen current action. The reward $r_{S,A}$, such as $(r_{S,A})$ 340 described in connection with FIG. 3, may be an incentive provided to the agent for it to learn how to maximize long-term 1/WA (one divided by the write amplification factor), or a similar or related factor. The reward may be generated by observing the value of the WA in physical memory for every action chosen by the agent. The reward may be communicated back to the agent in order to aid learning for the agent.

In block 535, q-score/q-value table entries for the current state within the table may be updated. For example, the q-score/q-value table entries of the table for the current state and the current action may be updated according to the following Bellman equation:

$$Q(S,A)=Q(S,A)+\alpha[rS,A+\gamma \max A' Q(S',A')-Q(S,A)]$$

In this equation, α may be the learning rate, γ may be the discount factor for future rewards, S may be the current state, A may be the current action, S' may be the next state, and A' may be the next action. This equation may represent the q-score or q-value that may be stored as an entry in the (S, A) position within the q-score/q-value table. Particularly, the state, action pair (S, A) may denote the index to the q-score/q-value table for a particular entry. By way of example only, S may indicate a row within the q-score/q- value table and A may denote a column within the q-score/q-value table and an entry of the q-score/q-value table may be accessed using this pair S and A.

In block 540, the entries in the updated q-score/q-value table may be used to train a neural network, such as a deep neural network (DNN). In particular, the DNN may be used to predict values/entries for states and actions that may not yet be incorporated within the q-score/q-value table. A neural network, such as a DNN, may include an input layer, one or more middle layers, and an output layer. The middle layers may also be known as the hidden layers. Each node of the hidden layer may be connected to each node in the input layer and each node in the output layer. Each node in a hidden layer may be connected to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs. The neural network may be constructed with recurrent connections such that the output of the hidden layer of the network feeds back into the hidden layer again for the next set of inputs. In the case where the deep neural network predicts values/entries for states and actions that may not yet be incorporated with the q-score/q-value table, each node of the neural network input layer may represents at least one feature of the q-score/q-value table, the current state, or the current action, etc. Each node of the neural network output layer may represent one or more possible values/entries for the q-score/q-value table. Such a DNN may be trained, whereby the weight or score for the connections may be updated or determined based on the values/entries in the q-score/q-value table. The DNN may be trained using any or every state or action in the q-score/q-value table, as well as state or action encountered.

The DNN may be pre-trained by simulated interaction with the environment. For example, the DNN may be pre-trained using a realistic stream of write requests that may be provided to the DNN. The DNN may be initialized with small weights, which may initially make poor q-score/q-value predictions, and therefore allow for poor determinations about actions to be taken by the agent. This may be because the predictions of the q-score/q-value may be random or nearly random. However, gradually, the DNN may improve its ability to predict entries for the q-score/q-value table after undergoing training.

In block 545, entries that are not present in the q-score/q-value table may be predicted using the DNN. For example, for a given current state, S, the DNN may be used to predict an entry in the q-score/q-value table for each possible current action. This may occur when the q-score/q-value table does not include an entry for the possible current state, when the q-score/q-value table does not include an entry for the possible current action, or when the q-score/q-value table does not include an entry for both the current state and the current action.

Although various operations within blocks contemplate the use of a DNN, other machine learning models may additionally or interchangeably be used for training and/or prediction of q-scores/q-values and for updating the table. Examples of such machine learning models may include linear regression models, logistic regression models, decision trees, support vector machines, Bayesian network models, kNN models, k-means models, random forest models, dimensionality reduction models, genetic algorithms, gradient boosting models, clustering models, other neural networks, and the like.

In block 555, the least recently used entry or entries from the q-score/q-value table may be removed. This may be done to save memory space taken by the q-score/q-value table. The least recently used entry may be known based on counters, based on stored history information, based on memory access information, or any other such way of determining the least recently used entry.

In block 560, the operations in connection with blocks 525, 530, 535, and 540 may be performed. These operations may preferably be performed in order. In some examples, particular operations may be performed in a different order, may be skipped, or may be performed multiple times.

In particular, because the state/action space for the reinforcement learning algorithm may be large, there may be a large number of state and action pairs. As a result, there may be an increasingly large number of q-scores/q-values entries that result. Rather than storing each one of these entries in the q-score/q-value table, which may consume enormous resources and computing memory, a cached q-score/q-value table approach may be advantageous. Such an approach, as described above, may involve predicting and unknown q-score/q-value entries using a DNN when a current state and/or current action are not present in the q-score/q-value table. Further the approach may involve removing the least recently used entry or entries of the q-score/q-value table. This approach may ensure that the q-score/q-value table maintains a constant or near-constant size.

In addition, a salient feature of the design presented herein may be that q-scores/q-values may capture long-term reward, rather than solely an instantaneous reward. This may result in an agent, which makes use of reinforcement learning, and which may 'learn' an optimal or near-optimal mapping algorithm for writing to physical memory without heuristics supplied by the designer. In addition, during the course of using reinforcement learning for mapping and writing data to physical memory, many states are likely to be revisited by an agent. Therefore, the hybrid approach, described above, of using a cached q-score/q-value table with the DNN may be memory and time efficient. Specifically, the size of the stored q-score/q-value table may be small and the DNN may be used to make predictions in relatively infrequent cases where there is a q-score/q-value table miss, that is, where there is a missing entry in the q-score/q-value table.

Although various blocks, algorithms, or the like may be described or claimed in a particular sequential order, such processes may be configured to work in different orders. In other words, any sequence or order of operations that may be explicitly described or claimed does not necessarily indicate a requirement that the operations be performed in that order. The operations of processes described herein may be performed in any order possible, and operations may be added or omitted.

Although a process may be described as including a plurality of operations, that does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

Figure 6:
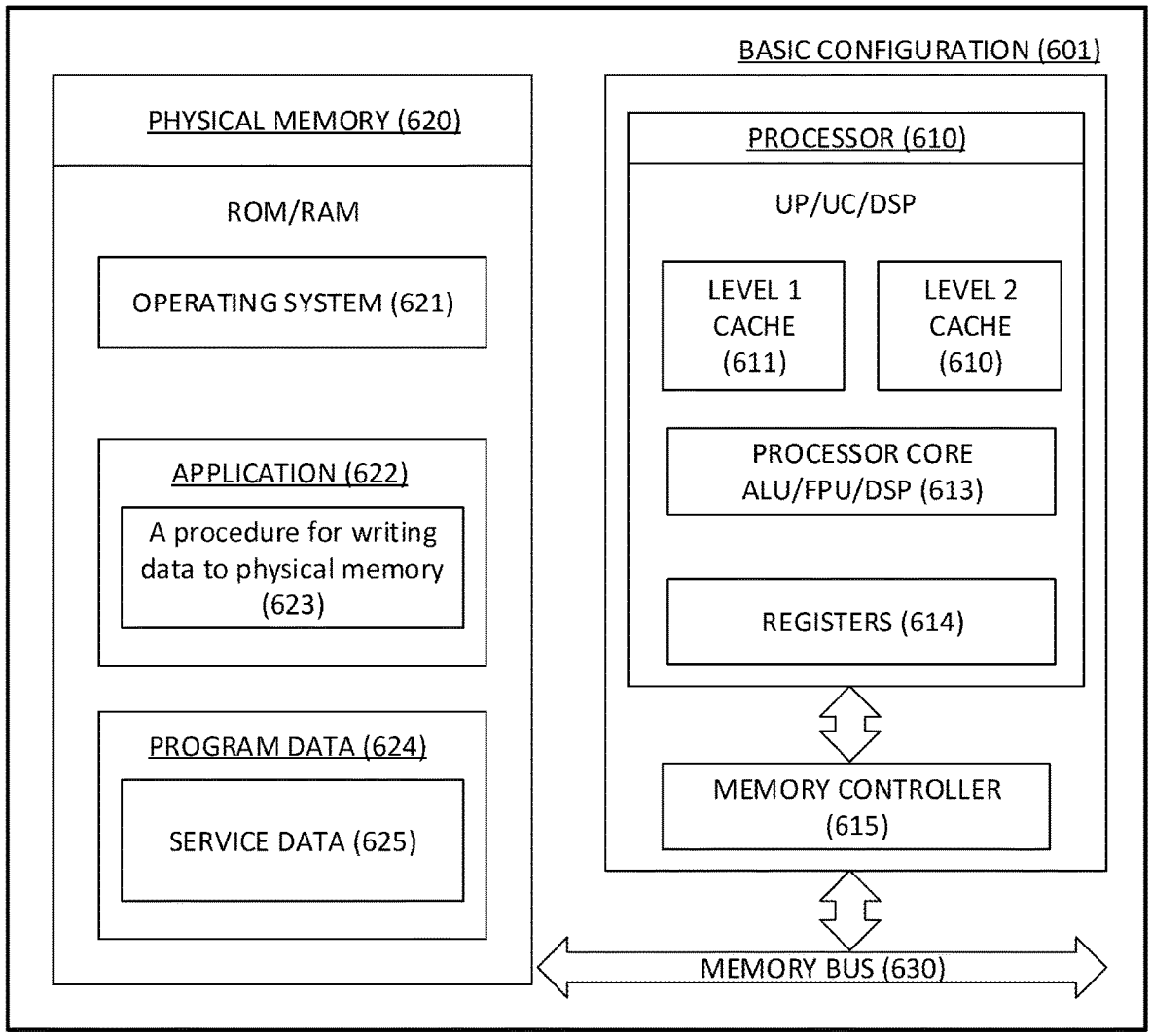
FIG. 6 is a block diagram of an example computing device in accordance with aspects of the disclosure.

FIG. 6 is a block diagram of an example computing device 600. The computing device 600 may include one or more processors 610 and system memory 620. A memory bus 630 may be used for communicating between the processor 610 and the system memory 620. The computing device 600 may be similar to host computing device 110 described in connection with FIG. 1.

Depending on the desired configuration, the processor 610 may be of any type including but not limited to a microprocessor (uP), a microcontroller (uC), a digital signal processor DSP), or any combination thereof. The processor 610 may include one more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 can be an internal part of the processor 610. The memory controller 615 may be similar in form and function to the memory controller 130 described in connection with FIG. 1.

Depending on the desired configuration, the physical memory 620 may be of any type including but not limited to volatile memory, such as RAM, non-volatile memory, such as ROM, flash memory, etc., or any combination thereof. The physical memory 620 may be similar in form and function to physical memory 150 described in connection with FIG. 1. The physical memory 620 may include an operating system 621, one or more applications 622, and program data 624. The application 622 may include a process of writing data to physical memory. Non-transitory computer-readable medium program data 624 may include storing instructions that, when executed by the one or more processing devices, implement a process for writing data to physical memory 623. In some examples, the application 622 may be arranged to operate with program data 624 on an operating system 621.

The computing device 600 may have additional features or functionality, and additional interfaces to facilitate communications between the basic configuration 601 and any required devices and interfaces.

Physical memory 620 may be an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device 600.

The computing device 600 may be implemented as a portion of a small form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device 600 may also be implemented as a personal computer including both laptop computer and non-laptop computer configurations. The computing device 600 may also be implemented as a server or a large-scale system.

The systems and techniques presented herein detail a principled approach to FTL design using reinforcement learning. The applications of the systems and techniques may include improved mapping algorithms which reduce write-amplification in a way that may be agnostic to garbage collection and wear leveling algorithms. This may improve the performance of physical memory, such as flash memory solid state drives, in terms of increasing lifetime, reducing latency, and reducing storage space needed. This approach may be different than one that solely uses upstream data characteristics and clustering in order to select the optimal write-points for data in physical memory. The reinforcement learning approach described herein may be useful for write-amplification reduction as related to physical memory devices. The efficiency of the reinforcement learning approach described herein may also be improved using a q-score/q-value table cache and pre-trained DNN as described also herein. Additionally, for efficiency, the reinforcement learning approach may be bolstered by using learning algorithm ensembles for dimension reduction in the RL state space as described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Aspects of the present disclosure may be implemented as a computer implemented process, a system, or as an article of manufacture such as a memory device or non-transitory computer readable storage medium. The computer readable storage medium may be readable by a computing device and may comprise instructions for causing a computing device or other device to perform processes and techniques described in the present disclosure. The computer readable storage medium may be implemented by a volatile computer memory, non-volatile computer memory, hard drive, solid state memory, flash drive, removable disk, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The title of the present application and headings of sections provided in the present application are for convenience only, and are not to be taken as limiting the disclosure in any way.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

The foregoing discussion is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The invention claimed is:

1. A method of writing data to physical memory, the method comprising:
   determining a current state based on the physical memory;
   executing, using one or more processors, an agent to choose a current action from a plurality of actions based on a corresponding plurality of entries of a table, the plurality of entries of the table each being associated with a write amplification factor based on a location within the physical memory to write data;
   writing the data to the physical memory based on the current action;
   observing a reward related to a write amplification factor associated with the physical memory based at least in part on the current state and the current action;
   updating, using the one or more processors, at least one entry of the plurality of entries of the table based on the observed reward to produce an updated table; and
   predicting at least one new entry to add to the updated table using a neural network trained with the updated table.

2. The method of claim 1, further comprising training the neural network using the updated table by determining or updating a weight for connections of the neural network based on the entries in the updated table.

3. The method of claim 1, wherein the physical memory is a flash memory, and wherein the agent includes a memory mapping algorithm.

4. The method of claim 1, wherein each entry of the plurality of entries of the table is a q-score/q-value calculated using reinforcement learning.

5. The method of claim 1, wherein updating, using the one or more processors, the at least one entry of the plurality of entries of the table includes updating the at least one entry of the plurality of entries of the table using a Bellman equation.

6. The method of claim 1, wherein the agent chooses the current action based on one of a greedy policy, an ε-greedy policy, or a decaying ε-greedy policy.

7. The method of claim 1, wherein the reward is a value that is inversely related to the write amplification factor associated with the physical memory.

8. The method of claim 1, further comprising removing a least recently used entry of the plurality of entries in the table.

9. The method of claim 1, wherein each node of an input layer of the neural network represents at least one feature of the table, current state, or current action.

10. The method of claim 1, wherein each node of an output layer of the neural network represents at least one possible entry for the table.

11. A system for writing data to physical memory, the system comprising one or more processors configured to:
    determine a current state based on the physical memory;
    execute an agent to choose a current action from a plurality of actions based on a corresponding plurality of entries of a table, the plurality of entries of the table each being associated with a write amplification factor based on a location within the physical memory to write data;
    write the data to the physical memory based on the current action;
    observe a reward related to a write amplification factor associated with the physical memory based at least in part on the current state and the current action;
    update at least one entry of the plurality of entries of the table based on the observed reward to produce an updated table; and
    predict at least one new entry to add to the updated table using a neural network trained with the updated table.

12. The system of claim 11, wherein the one or more processors are further configured to train the neural network using the updated table by determining or updating a weight for connections of the neural network based on the entries in the updated table.

13. The system of claim 11, wherein the physical memory is a flash memory, and wherein the agent includes a memory mapping algorithm.

14. The system of claim 11, wherein each entry of the plurality of entries of the table is a q-score/q-value calculated using reinforcement learning.

15. The system of claim 11, wherein the one or more processors are further configured to update the at least one entry of the plurality of entries of the table using a Bellman equation.

16. The system of claim 11, wherein the agent chooses the current action based on one of a greedy policy, an ε-greedy policy, or a decaying ε-greedy policy.

17. The system of claim 11, wherein the reward is a value that is inversely related to the write amplification factor associated with the physical memory.

18. The system of claim 11, wherein the one or more processors are further configured to remove a least recently used entry of the plurality of entries in the table.

19. A non-transitory computer-readable medium storing instructions, that when executed by one or more processors, cause the one or more processors to:
    determine a current state based on a physical memory;

execute an agent to choose a current action from a plurality of actions based on a corresponding plurality of entries of a table, the plurality of entries of the table each being associated with a write amplification factor based on a location within the physical memory to write data;

write data to the physical memory based on the current action;

observe a reward related to a write amplification factor associated with the physical memory based at least in part on the current state and the current action;

update at least one entry of the plurality of entries of the table based on the observed reward to produce an updated table; and predict at least one new entry to add to the updated table using a neural network trained with the updated table.

20. The non-transitory computer-readable medium of claim 19, wherein the instructions, that when executed by the one or more processors, further cause the one or more processors to train the neural network using the updated table by determining or updating a weight for connections of the neural network based on the entries in the updated table.

21. The non-transitory computer-readable medium of claim 19, wherein the physical memory is a flash memory, and wherein the agent includes a memory mapping algorithm.

22. The non-transitory computer-readable medium of claim 19, wherein each entry of the plurality of entries of the table is a q-score/q-value calculated using reinforcement learning.

\* \* \* \* \*